Nov. 23, 1954  P. D. COPPOCK ET AL  2,695,285
PROCESSES FOR DRYING STREPTOMYCIN
Filed Nov. 1, 1949
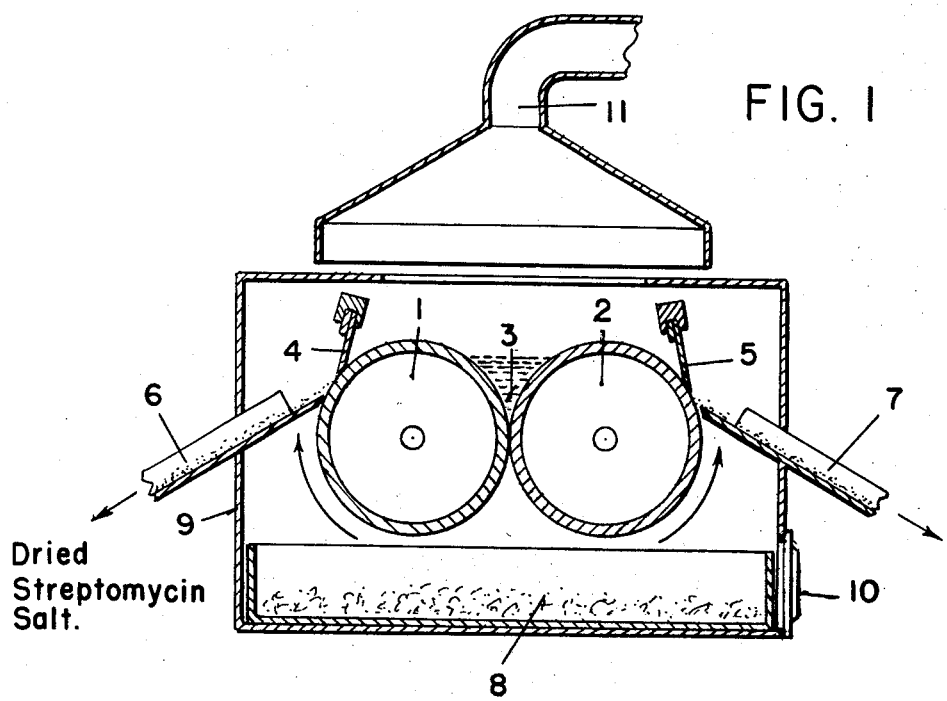
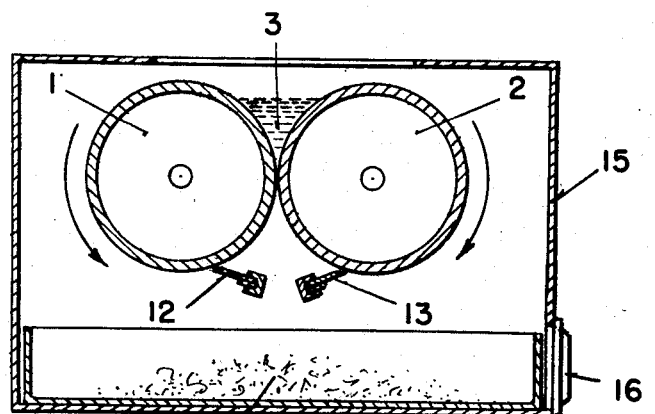
Inventors:
Philip Dalton Coppock, and
John Talbot McCombie,
By
E. F. Wenderoth
Attorney

United States Patent Office 2,695,285
Patented Nov. 23, 1954

2,695,285

PROCESSES FOR DRYING STREPTOMYCIN

Philip Dalton Coppock, Epsom Downs, and John Talbot McCombie, Walton-on-the-Hill, England, assignors to The Distillers Company Limited, Edinburgh, Scotland, a British company Application November 1, 1949, Serial No. 124,763

Claims priority, application Great Britain November 4, 1948

9 Claims. (Cl. 260—210)

The present invention relates to an improved process for the production of streptomycin.

Processes for the production and purification of streptomycin are well known in the art, and for example comprise the growth of a streptomycin producing organism such as Streptomyces griseus on a suitable medium, at the termination of the fermentation the culture fluid being filtered or centrifuged and the streptomycin recovered therefrom. The filtrate may be purified by charcoal treatment or by chromatographic methods, a purified solution of a streptomycin salt being ultimately obtained from which the streptomycin is recovered by precipitation for example with ether or acetone, followed by the drying of the precipitate, or by the desiccation of the solution of the streptomycin salt, most suitably by freeze drying. Although freeze drying of the streptomycin salt solutions gives satisfactory results, freeze drying processes are very costly and require expensive equipment and are therefore uneconomic for use on a commercial scale. On the other hand the processes normally used for the drying of solvent precipitated streptomycin salts seldom result in the formation of a dry product free from gum, unless the drying conditions are very carefully controlled.

It has now been found that streptomycin solutions, dispersions, pastes and the like can be simply desiccated without the occurrence of any undesirable gum formation if any water associated with the streptomycin is not allowed to form a separate aqueous phase during the drying operation.

Accordingly the present invention comprises the process for the desiccation of solutions, dispersions or pastes and the like of streptomycin salts which contain water by means of heat, wherein an organic solvent capable of forming a low boiling azeotrope with water and which has a substantial solubility for water and such other solvents that form the solution, dispersion or paste is added thereto and the mixture heated to remove all the water present as a vaporous mixture with said organic solvent giving a substantially anhydrous streptomycin salt.

The streptomycin salt may be prepared by the methods known in the art and is suitably purified before being dried. Although the present invention can be applied to the desiccation of any streptomycin salt, such as for example the streptomycin carboxylic and sulphonic acid salts and streptomycin helianthate, is of particular application in the drying of streptomycin sulphate or streptomycin hydrochloride, which are the salts of streptomycin most frequently met with and used for therapeutic purposes.

Streptomycin salts are normally substantially only water soluble, and consequently the streptomycin salt obtained at the termination of purification operations is usually in the form of an aqueous solution or aqueous-organic solvent solution or dispersion thereof.

It is within the scope of the present invention to dry aqueous solutions of streptomycin salts, for example, by distillation in the presence of an organic solvent which is capable of forming a low boiling azeotrope with water and during the distillation to have sufficient of the organic solvent present to maintain a homogeneous liquid phase, ultimately an anhydrous dispersion of the streptomycin salt in the organic solvent being obtained. An alternative process is to terminate the distillation when the solution is suffificiently concentrated to complete the drying by a different method such as spray drying.

It is obvious however that the drying of aqueous solutions of streptomycin salts in this way requires the employment of large amounts of the organic solvent used, in addition to the heat required for the distillation operation, and it is therefore economic to remove as much water as possible from the streptomycin salt by other means before the drying operation takes place. This is suitably effected by the precipitation of the streptomycin salt from its aqueous solution for example by means of an organic solvent in which the streptomycin salt is insoluble and which is immiscible with water and separating the precipitate suitably by centrifuging or filtration. Streptomycin sulphate is very satisfactorily precipitated from aqueous solution by acetone or methanol and streptomycin hydrochloride is very satisfactorily precipitated from aqueous solution by acetone.

The precipitate thus obtained comprises a mixture of the streptomycin salt, water and the organic solvent used as the precipitant, e. g. acetone or methanol and if such a mixture is dried alone for example in an autoclave or on a steam bath, the solvent evaporates leaving a mixture of water and the streptomycin salt which forms a gum. However, if the precipitate obtained in this way is dried according to the process of the present invention in the presence of an organic solvent as defined above, the formation of water as a separate phase is prevented, and the streptomycin salt is obtained as a dry solid.

The organic solvent capable of forming a low boiling azeotrope with water which is employed according to the process of the present invention is most suitably a lower molecular weight alcohol such as ethanol, propanol, isopropanol, butanol or amyl alcohol, an aliphatic ketone such as methyl isobutyl ketone or methyl ethyl ketone or an aliphatic carboxylic ester such as amyl acetate or ethyl acetate.

By the expression "the organic solvent has a substantial solubility for water" used in the Specification and claims is meant that the organic solvent has a solubility for water greater than 5%, and preferably greater than about 10%.

The amount of the solvent employed must be in excess of that required to remove the water present as a binary azeotrope since the streptomycin salt forms a gum in the presence of a separate water phase at elevated temperatures.

The desiccation of the streptomycin salt containing solution or dispersion can be effected by means of heat in any suitable way. Examples of methods which may be employed are flash distillation or simple distillation, where relatively large volumes of liquid have to be removed, or by drying in bulk as in heated trays, or where the soltuion or dispersion is in a suitable condition by spray drying or drying on a hot surface drier such as a drum drier. It is preferred to effect the drying of the material where possible by drum drying or spray drying, since in such processes the drying operation is effected with a minimum contact time at elevated temperatures and consequently possibility of decomposition of the streptomycin salt at the elevated temperatures employed is substantially completely avoided. The streptomycin salts are reasonably heat stable, unlike penicillin salts, and when effecting the drying of these streptomycin salts according to the process of the present invention, decomposition of the streptomycin salt will not occur if care is taken to ensure that when the drying operation is completed the dry or substantially dry solid streptomycin salt obtained is not retained in contact with the heated surface of the container for any length of time.

For purposes of illustration suitable drum driers are shown in the accompanying drawings.

In Figure 1 the drums 1 and 2 consist of internally steam heated cylinders which revolve about substantially horizontal axes. These drums rotate towards each other at the top as shown in the drawing. The streptomycin salt/water/organic solvent mixture is supplied to the nip 3 of the drier, and the mixture is carried round on the drums as a thin film which is dried on the hot surface. The dried product is removed from the drum surface by the straight doctor knives 4 and 5 set close to the drum surface. The dried streptomycin salt is removed through the chutes 6 and 7, and any overflow of streptomycin salt drops into a tray 8 under the drums and this tray can be removed from the drum drier housing 9 through the hatch 10. The drum drier is provided with a hood 11 through which the generated vapours can be removed either by natural or forced draught.

In Figure 2 an alternative form of a double drum drier is shown, wherein the drums rotate away from each other at the top as shown. The dried streptomycin salt is removed from the drums by the straight doctor knives 12 and 13 and drops on to the tray 14 which can be withdrawn from the drum drier housing 15 through the hatch 16.

It is preferred when using a heated surface drier that the temperature of the heated surface is not greatly in excess of 100° C. It has been found that the use of steam heated surfaces is very effective and economical in the process of the present invention.

According to a preferred embodiment of the invention a purified or partially purified aqueous solution of streptomycin sulphate is treated with methanol to precipitate the streptomycin sulphate which is then separated by centrifuging or filtration as a cake wet with water and methanol. A volume of dry normal butanol equivalent to about 50–75% of the volume of the cake is added thereto and the mixture stirred well and supplied to a heated drum drier from which the dried streptomycin sulphate can be removed in the usual way, as a friable free flowing powder. If desired the dry material thus obtained can be submitted to a further drying operation, although in most cases this is unnecessary.

The following examples are given to illustrate the process of the present invention. In the following examples the parts by weight and parts by volume quoted bear the same relationship as do kilograms to litres. The percentages quoted are by weight unless otherwise indicated.

Example 1

An aqueous slurry of streptomycin sulphate, consisting of the centrifuged precipitate obtained by adding 800 parts by volume of methyl alcohol to 100 parts by volume of an aqueous solution of streptomycin sulphate containing 6.67% of streptomycin sulphate and acidified to pH 1.5 to 2.0 with sulphuric acid, is slurried with 35 parts by volume of ethyl alcohol and the slurry obtained dried by placing in a steam (100° C.) heated aluminum tray for 15 minutes.

The dry streptomycin sulphate is obtained as a friable powder. No gum formation takes place during the drying operation.

The streptomycin sulphate referred to in the preceding paragraphs may be replaced by other streptomycin salts such as streptomycin acetate, streptomycin propionate, streptomycin hydrochloride and streptomycin helianthate.

The ethyl alcohol, used by way of example in the preceding paragraphs, may be replaced, if desired, by any one of a large number of other organic solvents of the type hereinbefore described, the parts by volume of such being the same (35) as in the case of the ethyl alcohol. The results obtained are given in the following table.

| Ex. No. | Organic solvent | Comments |
| --- | --- | --- |
| 2 | Ethyl acetate | The dry streptomycin sulphate is obtained as a friable powder. No gum formation takes place. |
| 3 | Methyl isobutyl ketone | Do. |
| 4 | Amyl alcohol | Do. |
| 5 | Normal butyl alcohol | Do. |
| 6 | Normal propyl alcohol | Do. |
| 7 | Ethyl lactate | Do. |
| 8 | Iso butyl alcohol | Do. |
| 9 | Amyl acetate | Do. |
| 10 | Methyl ethyl ketone | Do. |

If, for comparative purposes, the streptomycin sulphate filter cake, for example, be dried alone or with the addition of methyl alcohol, it is found in both cases that considerable gumming of the streptomycin occurs.

Example 11

4.54 parts by volume of methyl alcohol is added to 4.54 parts by volume of an aqueous concentrate of streptomycin sulphate assaying 35,200 units of streptomycin per millilitre, the precipitated impurities filtered off, and 36.32 parts by volume of methyl alcohol added with stirring to the filtrate. The resulting precipitate—comprising the streptomycin sulphate is separated as a slurry by decantation which is centrifuged to give a wet cake of streptomycin sulphate. This cake is mixed with 0.7 part by volume of dry normal butyl alcohol (in amount corresponding to about ¾ the volume of the cake) the resulting mixture having the consistency of thick cream, which is then fed to the nip of a double drum drier, the drums being 5 inches in diameter by 7 inches long and heated with steam at atmospheric pressure. The rate of rotation of the drums is such that the time of rotation of the drum surface from the nip to the knife blades is 84 seconds. 0.475 part by weight of pale buff coloured streptomycin sulphate is thus obtained as a free flowing powder, the solid assaying 320 units of streptomycin per milligram. The overall recovery from the aqueous concentrate to the final dried powder is thus 95%. No gum formation occurred during the drying operation.

Example 12

To one part by volume of an aqueous solution of streptomycin hydrochloride is added 8 parts by volume of acetone and the precipitated streptomycin hydrochloride is filtered off. The streptomycin hydrochloride filter cake is admixed with 0.4 part by volume of normal butyl alcohol and the resulting mixture fed to the nip of a drum drier as described in Example 11. The streptomycin hydrochloride is obtained as a dry friable powder without any formation of gummy products.

Example 13

54 litres of methyl alcohol are added to 54 litres of an aqueous concentrate of streptomycin sulphate containing 945 mega units of streptomycin and the precipitated impurities are filtered off. To the filtrate is added 486 litres of methyl alcohol thus precipitating the streptomycin sulphate. The mixture is allowed to settle and the supernatant liquid decanted off and the resulting slurry comprising the precipitated streptomycin sulphate centrifuged. The centrifuged slurry is mixed with normal butyl alcohol and recentrifuged, and this addition of normal butyl alcohol and centrifuging of the slurry repeated twice. The final slurry containing streptomycin sulphate, normal butyl alcohol, methyl alcohol and water is supplied to the nip of a double drum drier, the drums being 9 inches in diameter by 15 inches long and heated with steam at atmospheric pressure. The rate of rotation of the drums is such that the time for rotation of the drum surface from the nip to the knife blades is 80 seconds. The streptomycin sulphate is obtained as a free flowing powder the solid assaying 250 units of streptomycin per milligram. No gum formation occurred during the drying operation.

We claim:

1. A process for preparing a substantially anhydrous streptomycin salt which comprises adding to an aqueous streptomycin salt an organic solvent which has a solubility for water greater than 5% and is capable of forming a low boiling azeotrope with water and heating the mixture at substantially atmospheric pressure to remove all the water present azeotropically in vaporous admixture with the organic solvent.

2. A process as claimed in claim 1 wherein said organic solvent is an aliphatic alcohol of 2 to 5 carbon atoms.

3. A process as claimed in claim 1 wherein said organic solvent is an aliphatic ketone of 4 to 6 carbon atoms.

4. A process as claimed in claim 1 wherein the streptomycin salt treated is streptomycin sulphate.

5. A process as claimed in claim 1 wherein the streptomycin salt treated is streptomycin hydrochloride.

6. A process for preparing a substantially anhydrous streptomycin salt which comprises adding to an aqueous paste, consisting essentially of a streptomycin salt, an organic solvent which has a solubility for water greater than 5% and is capable of forming a low boiling azeotrope with water, supplying the mixture at substantially atmospheric pressure to a heated drying zone to remove all the water present azeotropically in vaporous admixture with the organic solvent and recovering the substantially anhydrous streptomycin salt.

7. A process as claimed in claim 6 wherein said mixture consisting of the aqueous paste of a streptomycin salt and the organic solvent is supplied to a drum drier.

8. A process for preparing substantially anhydrous streptomycin sulphate from an aqueous solution thereof which comprises the steps of precipitating the streptomycin sulphate from the solution by the addition of an organic solvent from the class consisting of acetone and methyl alcohol, separating the precipitated streptomycin sulphate and adding thereto an organic solvent which has a solubility for water greater than 5% and is capable of forming a low boiling azeotrope with water, supplying the mixture at substantially atmospheric pressure to a heated drying zone to remove all the water present azeotropically in vaporous admixture with the organic solvent and recovering the substantially anhydrous streptomycin sulphate.

9. A process for preparing substantially anhydrous streptomycin hydrochloride from an aqueous solution thereof which comprises the steps of precipitating the streptomycin hydrochloride by the addition of acetone, separating the precipitated streptomycin hydrochloride and adding thereto an organic solvent which has a solubility for water greater than 5% and is capable of forming a low boiling azeotrope with water, supplying the mixture at substantially atmospheric pressure to a heated drying zone to remove all the water present azeotropically in vaporous admixture with the organic solvent and recovering the substantially anhydrous streptomycin hydrochloride.

References Cited in the file of this patent

UNITED STATES PATENTS

| Number | Name | Date |
|---|---|---|
| 2,244,680 | Engstrom et al. | June 10, 1941 |
| 2,374,455 | Porsche et al. | Apr. 24, 1945 |
| 2,481,267 | Walti | Sept. 6, 1949 |
| 2,505,318 | Alburn et al. | Apr. 25, 1950 |
| 2,520,098 | Hodge | Aug. 22, 1950 |

FOREIGN PATENTS

| Number | Country | Date |
|---|---|---|
| 359,641 | Great Britain | Oct. 29, 1931 |

OTHER REFERENCES

A. A. Morton, Laboratory Technique in Organic Chemistry, 1st ed., pages 9–12, 238, Index (1938).

Atkins, Nature, V. 151 (1943), p. 449.